(12) United States Patent
Hechtfischer et al.

(10) Patent No.: US 10,969,076 B2
(45) Date of Patent: Apr. 6, 2021

(54) HIGH LUMINANCE LIGHT CONVERTING DEVICE

(71) Applicant: Lumileds LLC, San Jose, CA (US)

(72) Inventors: Ulrich Hechtfischer, Aachen (DE); Steffen Zozgornik, Leverkusen (DE)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 16/607,682

(22) PCT Filed: Apr. 20, 2018

(86) PCT No.: PCT/EP2018/060186
§ 371 (c)(1),
(2) Date: Oct. 23, 2019

(87) PCT Pub. No.: WO2018/197357
PCT Pub. Date: Nov. 1, 2018

(65) Prior Publication Data
US 2020/0191351 A1 Jun. 18, 2020

(30) Foreign Application Priority Data
Apr. 24, 2017 (EP) ..................................... 17167749

(51) Int. Cl.
*F21S 41/16* (2018.01)
*F21S 41/176* (2018.01)
(Continued)

(52) U.S. Cl.
CPC ............ *F21S 41/16* (2018.01); *F21S 41/176* (2018.01); *F21S 41/285* (2018.01); *F21S 45/47* (2018.01); *F21Y 2115/30* (2016.08)

(58) Field of Classification Search
CPC ... H01L 33/50–508; F21S 45/47; F21S 45/49; F21S 43/16; F21S 41/16; F21S 41/173; F21S 41/176; F21S 41/285
See application file for complete search history.

(56) References Cited

U.S. PATENT DOCUMENTS 9,897,303 B2 * 2/2018 Wu ..................... H01L 33/644
2011/0266580 A1 11/2011 Nicole et al.
(Continued)

FOREIGN PATENT DOCUMENTS

DE 102008027339 A1 * 11/2009
DE 102012204786 A1 * 9/2013 ............. F21V 29/70
(Continued)

OTHER PUBLICATIONS

EPO as ISA, PCT/EP2018/060186 filed Apr. 20, 2018, "International Search Report and Written Opinion", dated Jul. 4, 2018, 13 pages.
(Continued)

*Primary Examiner* — Mariceli Santiago (57) ABSTRACT

The invention describes a light converting device comprising:
a bonded layer stack comprising a light converter and a diamond layer, wherein the diamond layer is bonded to a bonding surface of the light converter, wherein the light converter is adapted to convert laser light to converted light, wherein a peak emission wavelength of the converted light is in a longer wavelength range than a laser peak emission wavelength of the laser light, wherein a refractive index of the diamond layer is bigger than a refractive index of the light converter, and
a light outcoupling structure attached to a first surface of the bonded layer stack, wherein a second surface of the bonded layer stack is a light-entrance surface arranged to receive the laser light, wherein the bonding surface is arranged between the first surface and the second surface of the bonded layer stack, wherein a refractive index of the light outcoupling structure is at least 90% of the refractive index of the light converter, and wherein the light outcoupling structure is optically coupled to the first surface of the bonded layer stack
(Continued)

such that total internal reflection of light traversing an emission path from the light-entrance surface to the light outcoupling structure is reduced.

The invention further describes a laser-based light source comprising such a light converting device and a vehicle headlight comprising such a laser-based light source.

14 Claims, 7 Drawing Sheets

(51) Int. Cl.
*F21S 45/47* (2018.01)
*F21S 41/20* (2018.01)
*F21Y 115/30* (2016.01)

(56) References Cited

U.S. PATENT DOCUMENTS

| | | | |
|---|---|---|---|
| 2014/0002074 A1* | 1/2014 | Qu | H01L 43/08 324/249 |
| 2015/0184830 A1 | 7/2015 | Nagao et al. | |
| 2016/0380161 A1 | 12/2016 | Rindt et al. | |

FOREIGN PATENT DOCUMENTS

| | | | |
|---|---|---|---|
| DE | 102012204786 A1 | 9/2013 | |
| WO | 2013144053 A1 | 10/2013 | |
| WO | WO-2020015363 A1 * | 1/2020 | G02B 26/00 |

OTHER PUBLICATIONS

Extended European Search Report dated Dec. 8, 2017, European Patent Application No. 17167749.5, 8 pages.

* cited by examiner

HIGH LUMINANCE LIGHT CONVERTING DEVICE

CROSS-REFERENCE TO RELATED APPLICATIONS

The present application is a § 371 application of International Application No. PCT/EP/2018/060186 filed on Apr. 20, 2018 and titled "HIGH LUMINANCE LIGHT CONVERTING DEVICE," which claims the benefit of European Application No. 17167749.5 filed on Apr. 24, 2017. International Application No. PCT/EP2018/060186 and European Patent Application No. 17167749.5 are incorporated herein.

FIELD OF THE INVENTION

The invention relates to a light converting device, a laser-based light source comprising such a light converting device and a vehicle headlight comprising such a laser-based light source.

BACKGROUND OF THE INVENTION

In high luminance light sources often a light converting device is used that is excited by e.g. blue light emitted by a laser. A light converter (e.g. ceramic phosphor) of the light converting device is adhered to a heatsink by means of a layer of glue or solder which is provided between the heatsink and the phosphor. The high intensity especially of blue laser light and the high temperature caused by the light conversion by means of the phosphor may cause reliability issues.

US20160380161A1 disclosed joining of an optic like a lens to a light converter. As an option for improving heat transfer from the light converter a metal or diamond layer in the form of a wire, conductor, network, or grid may be integrated on the bottom side of the converter, on the top side of the converter and/or in the converter.

US20150184830A1 disclosed diamond as a material for a heatsink or for a layer of the heatsink in contact with a light converter.

DE102012204786A1, in a reflection setup, disclosed a diamond platelet covering a light converter on the light entrance/exit side to transfer heat from the light converter along such side.

SUMMARY OF THE INVENTION

It is an object of the present invention to provide a light converting device which can provide a very high luminance e.g. of the order of several $Gcd/m^2$.

The invention is defined by the independent claims. The dependent claims define advantageous embodiments.

According to a first aspect of the invention a light converting device is provided. The light converting device comprises a bonded layer stack. The bonded layer stack consists of or comprises a light converter and a diamond layer. The diamond layer is bonded to a bonding surface of the light converter in a way such that a heat transfer coefficient between the diamond layer and the light converter is maximized. There is preferably no thermal contact resistance between both layers. The light converter is adapted to convert laser light to converted light, wherein a peak emission wavelength of the converted light is in a longer wavelength range than a laser peak emission wavelength of the laser light. A refractive index of the diamond layer (e.g. n=2.4 at 450 nm) is bigger than a refractive index of the light converter (e.g. n=1.8 at 450 nm). A light outcoupling structure is attached to a first surface of the bonded layer stack. A second surface of the bonded layer stack is a light-entrance surface arranged to receive the laser light. The bonding surface is arranged between the first surface and the second surface of the bonded layer stack. A refractive index of the light outcoupling structure is at least 90% of the refractive index of the light converter, preferably at least 95% of the refractive index of the light converter, and most preferably at least the same as the refractive index of the light converter. The light outcoupling structure is optically coupled to the first surface of the bonded layer stack such that total internal reflection of light traversing an emission path from the light-entrance surface to the light outcoupling structure is reduced.

Laser-based white-light sources comprising a light converting device as described above are very attractive in certain areas, e.g. in automotive headlights. The advantage of the laser-based light source is that laser light emitted by, for example, a blue laser diode can be focused to a much smaller spot on a light converter (or "phosphor") than a blue LED. A laserbased light source therefore can deliver very high luminance of the order of $Gcd/m^2$, a range that up to now could be reached only with short-arc gas discharge lamps.

Although the concept of a laser-pumped phosphor is simple it is difficult to implement for thermal reasons. The phosphor must be kept cool (<200° C.) to stay efficient. If the temperature rises the efficiency drops and the increased thermal losses raise the temperature even more. This vicious circle ("thermal rollover") leads to the complete "quenching" of the phosphor: light conversion is then very inefficient and the phosphor gets very hot (e.g. 300° C.).

The concepts known today all have the disadvantage that the maximum thermal load, and thus the luminance created, is limited by about 1 $Gcd/m^2$ because the thermal resistance Rth between the active region in the light converter (phosphor) and the next heatsink is too large. It can be shown that the maximum thermal resistance Rth still enabling a white-light source with a given luminance L fulfils the inequality $$L/256 * A * Rth < \Delta Tmax$$

with L being given in $cd/mm^2$, the surface area A of the light converter in $mm^2$, Rth in K/W, and $\Delta Tmax$ in K. In that, $\Delta Tmax$ is the maximum allowed temperature rise of the phosphor relative to the heatsink temperature. For example, a light converter with L=1000 $cd/mm^2$ and a surface area A=0.25 $mm^2$ that must work below $\Delta Tmax$=50 K can have Rth up to 50 K/W which is still feasible with a 1 µm thick glue layer (Rth=20 K/W) under a 50 µm light converter platelet (e.g. a ceramic phosphor) (Rth=12.5 K/W).

In contrast: To build an extreme light source with L=10000 $cd/mm^2$ and still keep the phosphor cold ($\Delta Tmax$<50 K), requires the product A*Rth to be 10× smaller. Assuming that the pump power and total flux remain the same as before this means that the area A needs to become 10× smaller. This allows Rth to stay the same as before, i.e. to get as large as 50 K/W. But given the 10× smaller area A, this is very hard to realize. In particular, even a very thin ceramic phosphor platelet of only 20 µm thickness but of such tiny surface area size of 0.025 $mm^2$ already contributes 100% of the maximally allowed thermal resistance Rth of 50 K/W, meaning that no further rise of Rth due to the interface and due to the heatsink can be tolerated.

A thin diamond layer, surface-bonded to the light converter, is therefore used as a heat spreader. The extremely high thermal conductivity of diamond (2000 W/(m*K) for bulk diamond and around 1000 W/(m*K) for the thin-layer configuration) reduces the thermal resistance of the light converter to the unavoidable internal heat resistance of the light converter, provided that the interface (bond) between the light converter and the diamond layer has negligible thermal contact resistance. Such a bond between the light converter (e.g. phosphor ceramic) and the diamond layer may, for example, be obtained by thermal bonding. The diamond layer may alternatively be deposited by chemical vapor deposition on a substrate consisting of light converting material (e.g. ceramic phosphor). The light converter substrate may subsequently be ground to the required thickness.

A light outcoupling structure with a refractive index being at least 90% of the refractive index of the material of the light converter is used in order to avoid guiding especially of the converted light within the sandwich structure formed by the diamond layer and the light converter. The light outcoupling structure is coupled to the diamond layer such that total internal reflection at any interface between the diamond layer and the light outcoupling structure is reduced. The light outcoupling structure may, for example, comprise a material which can be bonded (e.g. thermally bonded) to the diamond layer without any intermediate adhesive layer.

The diamond layer is arranged to spread the heat generated during conversion of the laser light to e.g. yellow converted light across an area which is much bigger than the area which is illuminated by means of the laser light. The thermal conductivity of the light outcoupling structure material may therefore be rather small (e.g. less than 1 W/(m*K)). It is therefore not necessary to use materials like sapphire with a thermal conductivity of more than 30 W/K in order to enable sufficient heat dissipation. The light outcoupling structure may, for example, be shaped like a (e.g. hemispherical) dome wherein a flat surface of the dome is coupled to the bonded layer stack.

Using the bonded layer stack without any light outcoupling structure in the transmission conversion approach (light enters the bonded layer stack via the light-entrance surface and leaves the bonded layer stack via the opposite surface of the bonded layer stack) seems to be advantageous at a first glance. The light outcoupling structure has the effect that the size of the illumination source (pumped spot of the light converter) appears bigger thus decreasing luminance. The magnification depends on the ratio between the refractive index of the light outcoupling structure and the refractive index of the adjacent material (usually air) to which the light should be outcoupled from light outcoupling structure. The magnification is in the case of a refractive index of 1.8 of the light outcoupling structure and outcoupling into air $3.24 = (n_{outcoupling\ structure}/n_{air})^2$.

This effect is only partly compensated by increasing the light output of the converted (e.g. yellow) light via the light outcoupling structure to 90% in comparison to around 50% without the light outcoupling structure. This reduces the luminance reduction only by a factor of 1.8.

But simulations have shown that, without the light outcoupling structure, the laser light and especially the converted light are guided and, thus, trapped within the bonded layer stack by total internal reflection. Only after several such reflections, smearing the light distribution within the bonded layer stack, the light can finally escape the bonded layer stack. In effect, such smearing as well causes an apparent magnification of the laser pumped spot of the light converter, being much more severe than the above discussed apparent magnification by the light outcoupling structure.

Thus, contrary to above discussed first glance thought, the luminance obtained with the light outcoupling structure is much higher than using the bonded layer stack alone without such light outcoupling structure.

A light outcoupling structure may consist of high refractive index n glasses like, for example, lanthanum dense flints or some dense flints or high n plastic materials used for lenses of spectacles. Plastic materials with a refractive index of more than 1.65 and especially more than 1.7 may have the advantage that the bonded layer stack can be easily attached to the light outcoupling structure at moderate temperatures of less than 200° C. such that no intermediate optical coupling layer is needed to glue the bonded layer stack to the light outcoupling structure.

The first surface of the bonded layer stack may be a surface of the diamond layer opposite to the surface of the diamond layer bonded to the bonding surface of the light converter.

Alternatively, the first surface of the bonded layer stack may be a surface of the light converter opposite to the bonding surface of the light converter. Simulations have shown that this configuration could further increase forward outcoupling (light outcoupling via the light outcoupling structure) by about 10% in comparison with the configuration with the diamond layer being next to the light outcoupling structure.

The light outcoupling structure may be attached to the first surface of the bonded layer stack by means of an optical coupling layer. A refractive index of the optical coupling layer is at least 90% of the refractive index of the light converter, more preferably at least 95% of the refractive index of the light converter, and most preferably the same as the refractive index of the light converter. The refractive index of the light outcoupling structure may be but has not necessarily to be equal to or bigger than the refractive index of the optical coupling layer. The optical coupling layer is used to adhere or glue the bonded layer stack to the light outcoupling structure. Proper selection of an optical transparent (at least in the wavelength ranges of the laser light and the converted light) adhesive for mechanically coupling the light outcoupling structure and the bonded layer stack may reduce optical losses which might otherwise be caused by reflection at their contact interfaces.

The optical coupling layer is preferably thinner than 10 μm, more preferably thinner than 5 μm, and most preferably thinner than 1 μm. Generally, the thickness of the optical coupling layer has to be small in comparison to the thickness of the light outcoupling structure. The thickness of the optical coupling layer has especially to be small in comparison to a radius r of the light outcoupling structure in case of a hemispherical light outcoupling structure (thickness<r/100). The optical coupling layer may, for example, be an optical glue with refractive index of 1.7 or more.

The diamond layer may be elongated, wherein a length of the diamond layer is at least two times a width of the diamond layer. The light converter may be characterized by the same dimensions (length and width) as the diamond layer especially in case of attaching the surface of the light converter to the light outcoupling structure. Alternatively, a part of the light converter may be removed.

The width of the diamond layer may preferably be less than 500 μm, preferably less than 400 μm, and most preferably less than 300 μm. The elongated form of the bonded layer stack and especially the diamond layer is sufficient for dissipation of heat generated during light conversion. The elongated form therefore reduces material required for the bonded layer stack and therefore cost. Furthermore, the elongated shape reduces guiding of laser light and converted light in three directions. Luminance which can be provided by means of the light converting device may therefore be increased.

The diamond layer or the bonded layer stack may be arranged asymmetric with respect to an optical axis of the light outcoupling structure. The asymmetric arrangement may be used to simplify thermal coupling to a heat sink.

The light converter may in case of an elongated bonded layer stack be arranged symmetrically with respect to the optical axis of the light outcoupling structure. The elongated bonded layer stack may in this case be arranged symmetrically or asymmetrically with respect to the optical axis of the light outcoupling structure. A part of the light converter may, for example, be removed such that the asymmetric diamond layer extends to one side of the light outcoupling structure in order to enable a good thermal coupling to the light outcoupling structure or an additional heat sink, wherein the remaining part of the light converter is arranged symmetrically around the optical axis. An extension of the light converter parallel to the length direction of the diamond layer is in this embodiment smaller than the length of the diamond layer.

A thickness of the light converter perpendicular to the bonding surface is less than 60 µm, preferably less than 40 µm, and most preferably less than 25 µm.

A thickness of the diamond layer perpendicular to the bonding surface is less than 60 µm, preferably less than 40 µm, and most preferably less than 25 µm.

The light outcoupling structure may be a half sphere. A diameter of the half sphere may be at least five times the longest extension of the light converter perpendicular to an optical axis of the half sphere. The size of the half sphere reduces aberration and in addition total internal reflection of light from the edges of the bonded layer stack is reduced. The optical axis is in this case arranged perpendicular to the circular cross-section of the half sphere to which the bonded layer stack is attached through the center of the circular cross-section. The extension of the light outcoupling structure may increase the total light output.

The bonded layer stack may be thermally coupled to a heat sink. The bonded layer stack may, for example, be coupled to the heat sink by means of a thermal coupling layer.

The diamond layer may be attached to the heat sink by means of the thermal coupling layer. Arranging the diamond layer such that there is no intermediate layer besides of the thermal coupling layer between the surface of the diamond layer and the surface of the heat sink may increase the heat transfer coefficient between the diamond layer and the heat sink. The thermal coupling layer may consist of a material with a relatively high thermal conductivity in order to provide an improved cooling of the light converter.

The bonded layer stack may comprise an antireflective coating attached to the lightentrance surface. The antireflective coating is arranged to reduce reflection of the laser light. The antireflective coating reduces or even avoids reflection of laser light around the peak laser wavelength. The antireflective coating may especially be useful in case of a surface of the diamond layer being the light-entrance surface because of the high refractive index of the diamond layer of around 2.4 in the wavelength range of blue laser light (around e.g. 450 nm).

The bonded layer stack may further comprise a reflective coating attached to the lightentrance surface. The reflective coating is arranged to reflect converted light. The reflective coating is transparent in a wavelength range comprising the peak emission wavelength of the laser light. The reflective coating is arranged to avoid or at least reduce losses of converted light via the light-entrance surface. The reflective coating may be identical with the antireflective coating described above.

The light converting device may, for example, be used in an automotive headlight comprising one or more lasers emitting laser light at a laser peak emission wavelength of 450 nm. The light converter may in this case comprise or consist of a yellow phosphor garnet (e.g. $Y_{(3-0.4)}Gd_{0.4}Al_5O_{12}$:Ce). A mixture of blue laser light and yellow converted light may be used to generate white light. Such a yellow phosphor garnet is characterized by a refractive index of around 1.8. It is therefore even possible to use a light outcoupling structure with essentially the same or even a higher refractive index as discussed above.

According to a further aspect a laser-based light source is provided. The laser based light source comprises a light converting device as described above and a laser.

The laser-based light source may comprise two, three, four or more lasers (e.g. arranged in an array) emitting, for example, blue laser light.

According to a further aspect a vehicle headlight is provided. The vehicle headlight comprises at least one laser-based light source as described above. The vehicle headlight may comprise two, three, four or more laser-based light sources as described above.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings.

In the Figures, like numbers refer to like objects throughout. Objects in the Figures are not necessarily drawn to scale.

DETAILED DESCRIPTION OF EMBODIMENTS

Various embodiments of the invention will now be described by means of the Figures.

Figure 1:
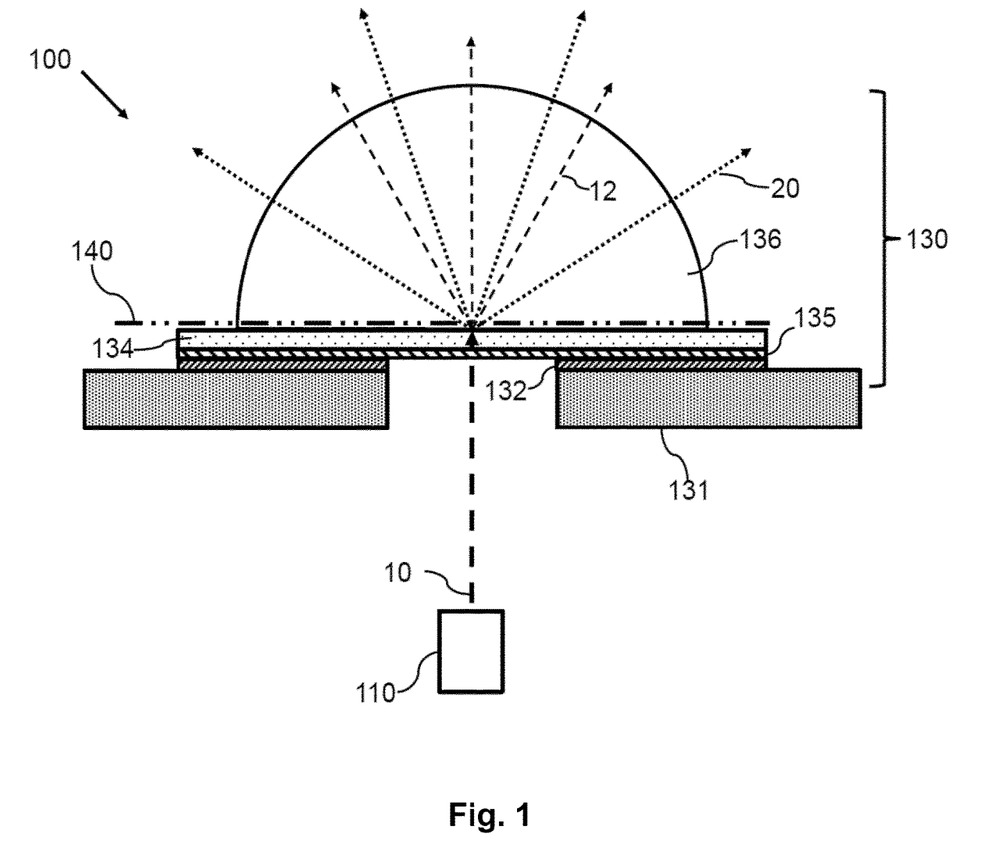
FIG. 1 shows a principal sketch of a first embodiment of an inventive light converting device

FIG. 1 shows a principal sketch of a first embodiment of an inventive light converting device 130 comprised by a laser-based light source 100. The light converting device 130 comprises a bonded layer stack comprising a diamond layer 135 and a light converter 134 which is thermally bonded to the diamond layer 135. The diamond layer 135 has in this embodiment a thickness of 25 μm and the light converter 134 has a thickness of 40 μm. The bonded layer stack does have a circular shape with respect to an optical axis of a light outcoupling structure 136 which is in this case a half sphere (diameter of e.g. 4 mm) consisting of glass attached (e.g. by thermal bonding) to the light converter 134 comprised by the bonded layer stack. Thermal bonding of the light outcoupling structure 136 to the bonded layer stack may have the advantage that there is no additional intermediate layer which may cause optical losses. Furthermore, thermal resistance between the light outcoupling structure 136 and the bonded layer stack may be reduced such that the light outcoupling structure 136 supports heat dissipation (acting as a heat sink). The light converter 134 comprises a phosphor (e.g. YAG:Ce) which is arranged to convert a part of blue laser light 10 emitted by laser 110 to yellow converted light 20. The light converting device 130 is therefore arranged to emit white light (a mixture of blue transmitted laser light 12 and yellow converted light 20). At least a part of the surface of the diamond layer 135 of the bonded layer stack which is arranged away from the light outcoupling structure 136 is used for receiving the laser light 10 emitted by the laser 110. A part of the surface of the diamond layer 135 which is used as light-entrance surface may be covered by an antireflective coating (not shown) in order to avoid or at least reduce reflection of laser light 10. The surface of the diamond layer 135 around the light-entrance surface or window is thermally coupled by means of a thermal coupling layer 132 to a heat sink 131. The heat sink 131 is in this case a rectangular aluminum block with a circular hole through which the laser light 10 hits the bonded layer stack.

Figure 2:
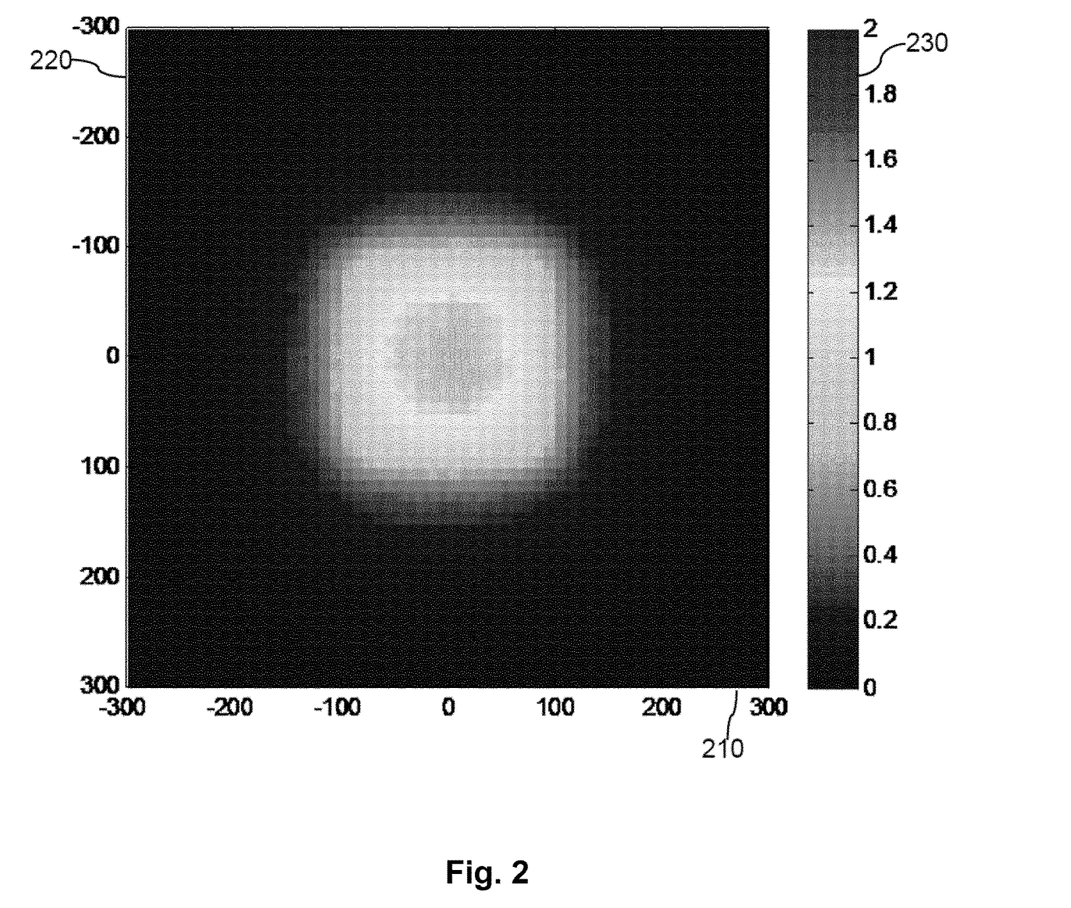
FIG. 2 shows simulation results of the light distribution with a similar light converting device as discussed with respect to the first embodiment

FIG. 2 shows simulation results of the light distribution along a horizontal direction 210 given in micrometers and a vertical direction 220 given in micrometers perpendicular to the direction of emission of laser light 10 in a simulation plane 140 across the light outcoupling structure 136 directly above (infinitesimal distance) the interface between the light outcoupling structure 136 and the light converter 134 as indicated in FIG. 1. The light converting device is similar to the light converting device 130 discussed with respect to the first embodiment in FIG. 1. The outer light converter surface of the bonded layer stack is in this case attached to the light outcoupling structure 136 by means of a glue. The bonded layer stack is characterized by a diameter of 12 mm and the diamond layer 135 and the light converter 134 have a thickness of 25 μm each. The light outcoupling structure 136 is again a half sphere dome with a refractive index of 1.8 (e.g. a glass consisting of lanthanum dense flint) which is the same as the refractive index of the light converter 134 (YAG:Ce) of the bonded layer stack. The glue is in this calculation also characterized by a refractive index of 1.8. The blue laser light 10 is injected to an area of 200 μm×200 μm perpendicular to the optical axis of the dome. The center of this area is aligned with the optical axis of the dome. Therefore, the yellow light (1 W of yellow light assumed in the simulation) is generated essentially in this small zone, too. The dome shaped outcoupling structure 136 does have the effect that the light is essentially only coupled out in the direction of the dome. The forward outcoupling (light emitted via the light outcoupling structure 136 in relation to the light provided by the laser 10) is better than 90%. Around 50% of the light is emitted by an area of 250 μm×250 μm around the optical axis. The intensity 230 is given in $10^7$ W/m² with a maximum of around $1.4*10^7$ W/m² at the center of the simulated light distribution (0 μm in the horizontal direction 210 and 0 μm in the vertical direction 220).

Figure 3:
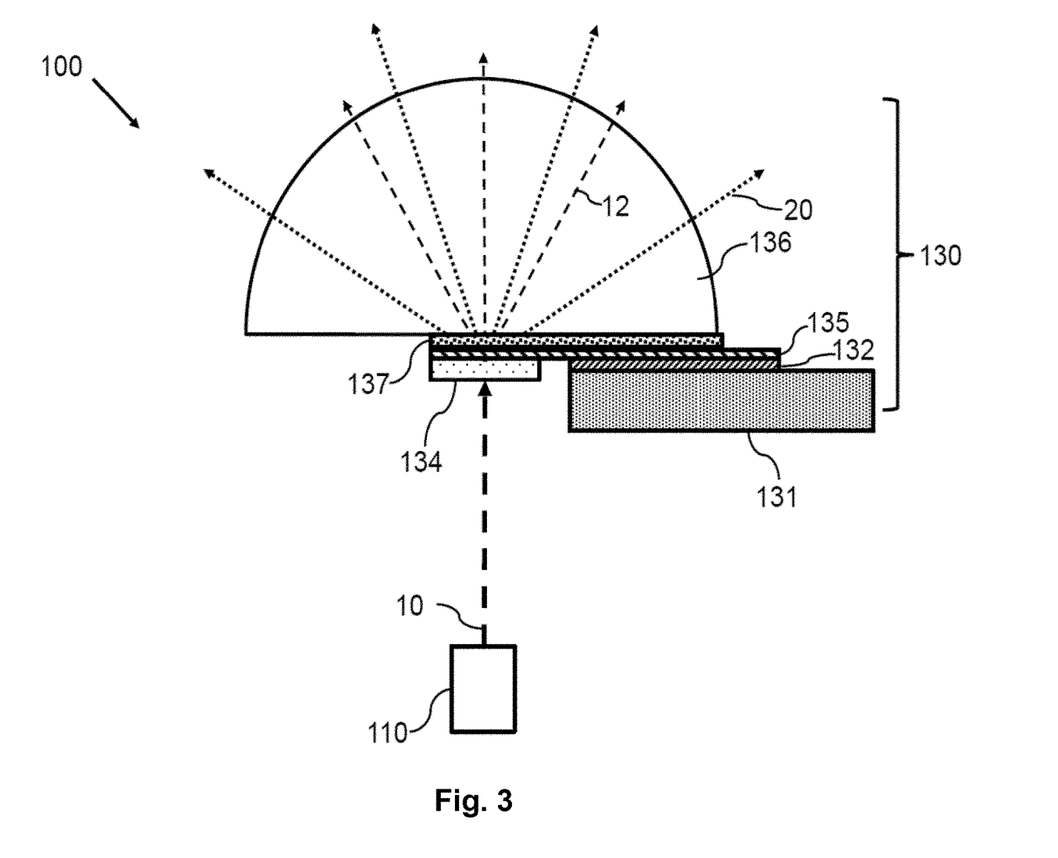
FIG. 3 shows a principal sketch of a cross-section of a second embodiment of an inventive light converting device

FIG. 3 shows a principal sketch of a cross-section of a second embodiment of an inventive light converting device 130 comprised by a laser-based light source 100. The light converting device 130 comprises a bonded layer stack comprising a diamond layer 135 and a light converter 134. The diamond layer 135 was deposited by means of chemical vapor position on the light converter 134. The diamond layer 135 has in this embodiment a thickness of 25 μm and the light converter 134 has a thickness of 25 μm as well. The diamond layer 135 of the bonded layer stack is characterized by an elongated shape with respect to the optical axis of the light outcoupling structure 136 which is in this case a plastic half sphere with an refractive index of 1.74 (high index lens material for ultra-thin lenses supplied by, for example, Mitsui Chemicals) glued by means of an optical coupling layer 137 to the diamond surface of the bonded layer stack located away from the bonding surface of the light converter 134. The optical coupling layer 137 is an optical glue (e.g. Norland Optical Adhesive 170) with a refractive index of around 1.7. The light converter 134 comprises a phosphor material (e.g. with a refractive index of 1.7 or 1.8) which is arranged to convert a part of the laser light 10 to converted light 20. The light converting device 130 is arranged to emit a mixture of transmitted laser light 12 and converted light 20. A part of the light converter 134 is removed from the diamond layer 135 such that there is only a circular shaped conversion area with a diameter of 250 μm to which the laser light 10 is emitted by the laser 110. A part of the surface of the elongated diamond layer 135 (width 250 μm and length 2 mm) which is not covered by the light converter 134 is thermally coupled by means of a thermal coupling layer 132 to a heat sink 131. The heat sink 131 is in this case a rectangular metal block. The simulations show that the light is surprisingly not lost via the side surfaces of the bonded layer stack having a substantial height of 50 μm in comparison to the width of 250 μm. The light outcoupling structure 136 and in this case the appropriately adapted optical coupling layer 137 reduce the likelihood of total internal reflection at this interface that much in comparison to the other surfaces that most of the light is coupled out via the transmission path bonded layer stack, optical coupling layer 137, and, finally, light outcoupling structure 136.

Figure 4:
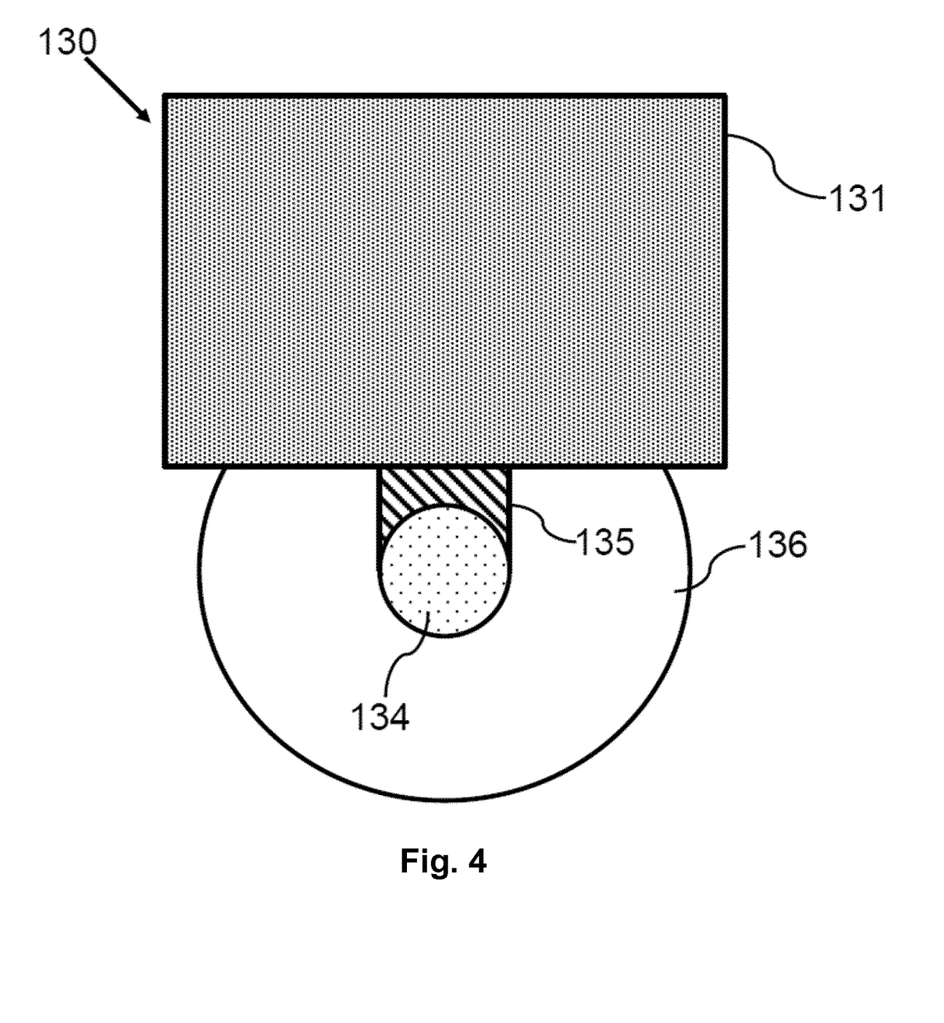
FIG. 4 shows a principal sketch of a bottom view of the second embodiment of the light converting device

FIG. 4 shows a principal sketch of a bottom view of the second embodiment of the light converting device 130. Bottom view means in this respect that the light converting device 130 is shown looking from the position of the laser 110 shown in FIG. 3. The elongated diamond layer 135 is bonded to the circular rest of the light converter 134 which is arranged circular symmetric with respect to the optical axis of the dome shaped light converter 136. A part of the elongated diamond layer 135 is sandwiched between the light outcoupling structure 136 and the heat sink 131. The thermal conductivity of around 1000 W/(m*K) of the diamond layer 135 in combination with the thickness and width of the diamond layer 135 are arranged such that the heat generated during illumination of the light converter can be dissipated. The temperature of the light converter 134 does not exceed 150° C. despite of the fact that a luminance of 5 Gcd/m² can be provided by means of the light converting device 130.

Figure 5:
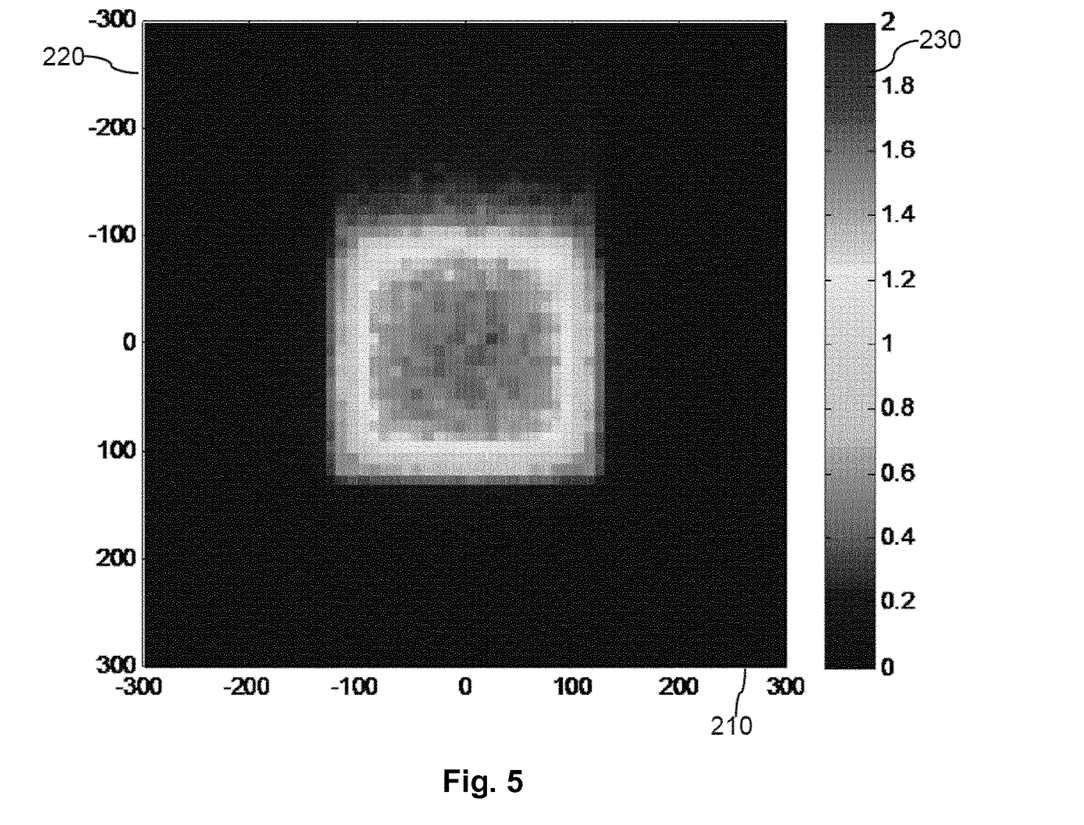
FIG. 5 shows simulation results of the light distribution with a light converting device similar as discussed with respect to the second embodiment

FIG. 5 shows simulation results of the light distribution with a light converting device 130 similar as discussed with respect to the second embodiment in FIGS. 3 and 4 above. The simulation results are computed for the simulation plane 140 as indicated in FIG. 1. The bonded layer stack has an elongated, in this case rectangular shape (tongue like stripe) with a width of 250 μm and a length of 2 mm. The surface of the diamond layer 135 which is arranged away from the bonding surface of the light converter 134 is bonded to the light outcoupling structure 136 by means of an optical glue. The material of the light outcoupling structure and the optical glue have the same refractive index as does the light converter 134 (n=1.8). A 200 μm×200 μm light generation area is illuminated by the laser 110 just as discussed with respect to FIG. 2. The light generation area is aligned with the optical axis of the light outcoupling structure. The elongated, rectangular shape avoids guiding of laser light 10 and converted light in three directions perpendicular to the optical axis of the light outcoupling structure 136 such that the intensity around the optical axis is even higher in comparison to the intensity distribution discussed with respect to FIG. 2. The maximum intensity 230 in the center of the light distribution is around $1.6*10^7$ W/m². The elongated shape can therefore be used to further increase the intensity or luminance of a laser-based light source 100 comprising the light converting device 130. At the same time sufficient cooling of the light converter 134 is enabled by means of thermal coupling of the diamond layer 135 to the heat think 131 (and to the light outcoupling structure 136).

Figure 6:
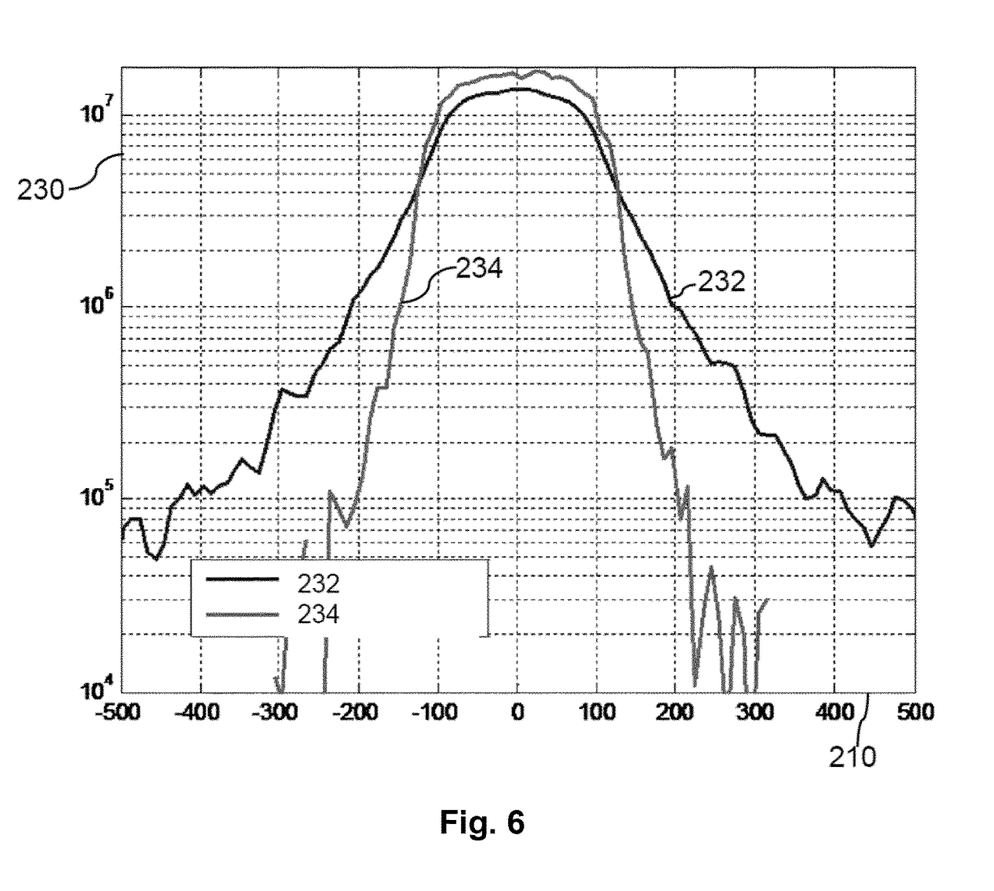
FIG. 6 shows simulation results comparing the embodiment discussed with respect to FIG. 2 and the embodiment discussed with respect to FIG. 5

FIG. 6 shows simulation results comparing the embodiment discussed with respect to FIG. 2 and the embodiment discussed with respect to FIG. 5. FIG. 6 shows the intensity distribution along a cross-section through the center of the intensity distribution. The horizontal axis shows the horizontal direction 210 in which the distance from the center (optical axis of the light outcoupling structure 136 extends through the center) is given in micrometer. The vertical axis shows the intensity 230 in W/m². Line 234 shows the intensity distribution of the stripe or tongue like elongated bonded layer stack as discussed with respect to FIG. 5. Line 232 shows the intensity distribution of the extended bonded layer stack as discussed with respect to FIG. 2. A comparison shows the higher intensity in a range of around +/−125 μm around the center of the light distribution in case of the embodiment with the elongated bonded layer stack.

Figure 7:
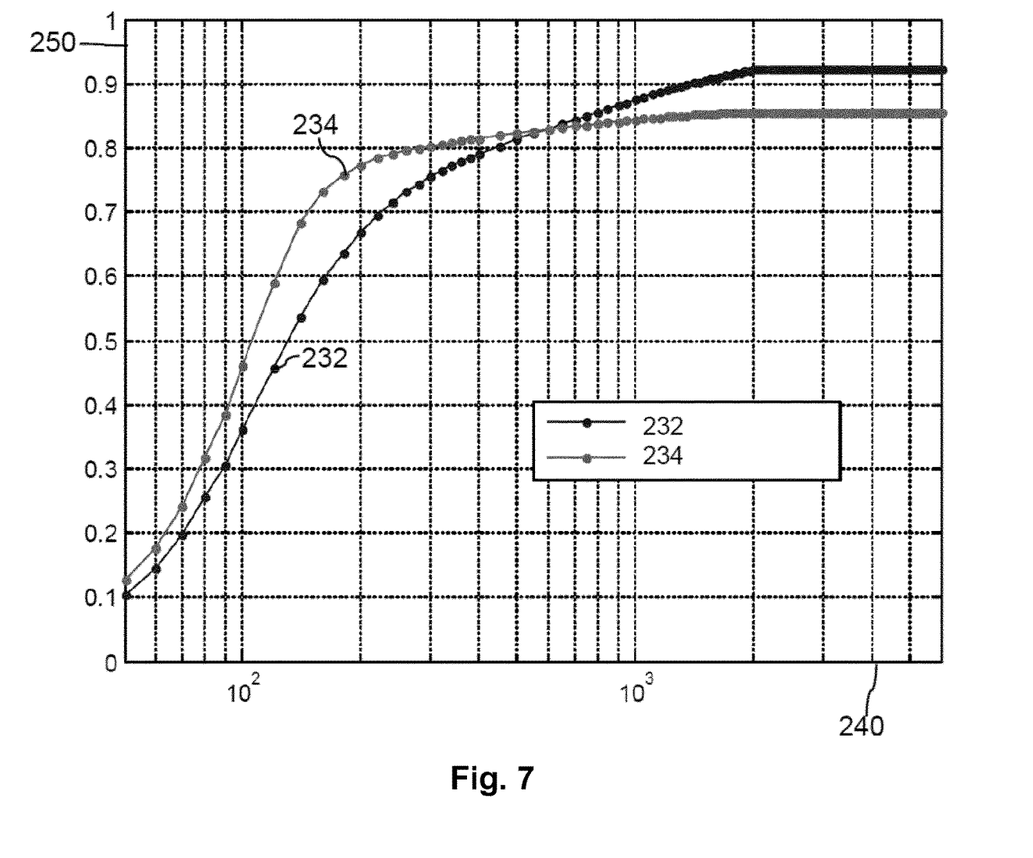
FIG. 7 shows another evaluation of the simulation results comparing the embodiment discussed with respect to FIG. 2 and the embodiment discussed with respect to FIG. 5

FIG. 7 shows another evaluation of the simulation results comparing the embodiment discussed with respect to FIG. 2 and the embodiment discussed with respect to FIG. 5. The horizontal axis shows a radius of the light emitting zone 240 around the optical axis in micrometer. The vertical axis shows the percentage of collected forward power 250. The graph confirms that the elongated bonded layer stack of FIG. 3 provides more light from smaller light-emitting zones (line 234) in comparison to the extended bonded layer stack (line 232) from FIG. 1 up to a radius of the light emitting zone of around 600 μm. The stripe like elongated bonded layer stack does therefore help to further increase luminance that can be provided by means of the light converting device 130.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 10 laser light
12 transmitted laser light
20 converted light
100 laser-based light source
110 laser
130 light converting device
131 heat sink
132 thermal coupling layer
134 light converter
135 diamond layer
136 light outcoupling structure
137 optical coupling layer
140 simulation plane
210 horizontal direction (micrometer)
220 vertical direction (micrometer)
230 intensity ($10^7$ W/m²)
232 relates to circular converter structure (FIG. 1)
234 relates to tongue like converter structure (FIG. 3)
240 radius of emitting zone (micrometer)
250 percentage of collected forward power

The invention claimed is:

1. Alight converting device comprising:
a light converter being adapted to convert laser light to converted light, a peak emission wavelength of the converted light being in a longer wavelength range than a peak emission wavelength of the laser light, the light converter having a first surface and an oppositely positioned second surface,
a diamond layer with a refractive index bigger than a refractive index of the light converter, the diamond layer bonded to and covering the entire second surface of the light converter, the light converter and the diamond layer forming by such bonding a bonded layer stack, and
a light outcoupling structure attached to a first surface of the bonded layer stack, a second surface of the bonded layer stack arranged to receive the laser light, the second surface of the light converter arranged between the first surface and the second surface of the bonded layer stack, a refractive index of the light outcoupling structure being at least 90% of the refractive index of the light converter, the light outcoupling structure optically coupled to the first surface of the bonded layer stack such that total internal reflection of light traversing the bonded layer stack from the second surface of the bonded layer stack to the light outcoupling structure is reduced.

2. The light converting device according to claim 1, wherein the first surface of the bonded layer stack is a surface of the diamond layer opposite to another surface of the diamond layer bonded to the second surface of the light converter.

3. The light converting device according to claim 1, wherein the first surface of the bonded layer stack is the first surface of the light converter.

4. The light converting device according to claim 1 wherein the light outcoupling structure is attached to the first surface of the bonded layer stack by means of an optical coupling layer, wherein a refractive index of the optical coupling layer is at least 90% of the refractive index of the light converter.

5. The light converting device according to claim 1 wherein the diamond layer is of elongated shape, wherein a length of the diamond layer is at least two times a width of the diamond layer.

6. The light converting device according to claim 5, wherein the light converter is arranged symmetrically with respect to an optical axis of the light outcoupling structure.

7. The light converting device according to claim 6, wherein the first surface of the bonded layer stack is a surface of the diamond layer opposite to another surface of the diamond layer bonded to the second surface of the light converter, and wherein an extension of the light converter parallel to the length direction of the diamond layer is smaller than the length of the diamond layer.

8. The light converting device according to claim 1, wherein the bonded layer stack is thermally coupled to a heat sink.

9. The light converting device according to claim 8, wherein the bonded layer stack is coupled to the heat sink by means of a thermal coupling layer.

10. The light converting device according to claim 9, wherein the diamond layer faces a surface of the heat sink.

11. The light converting device according to claim 10, wherein a part of the light converter is removed from the diamond layer, and wherein a surface of the diamond layer pointing away from the second surface of the light converter faces the light outcoupling structure.

12. The light converting device according to claim 1, wherein the bonded layer stack comprises an antireflective coating attached to the second surface of the bonded layer stack, wherein the antireflective coating is arranged to reduce reflection of the laser light.

13. A laser-based light source comprising:
a light converting device according to claim 1, and
at least one laser, the at least one laser being adapted to emit the laser
light to the second surface of the bonded layer stack.

14. A vehicle headlight comprising at least one laser-based light source according to claim 13.

* * * * *